Patented Nov. 18, 1941

2,263,014

UNITED STATES PATENT OFFICE 2,263,014

PREPARATION OF THIAZOLES

Winfield Scott, Akron, Ohio, assignor to Wingfoot Corporation, Wilmington, Del., a corporation of Delaware No Drawing. Application June 22, 1940,
Serial No. 341,969

6 Claims. (Cl. 260—304)

This invention relates to the preparation of thiazoles, by which term it is intended to designate compounds containing only hydrogen as a substituent on the 2-position:

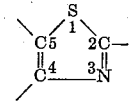

Such thiazoles, including derivatives containing various substituents on other positions of the thiazole ring, are known but they are prepared only with considerable difficulty and in poor yields by previously known methods, such as (1) by the reaction of formaminoacetal and phosphorus pentasulfide, (2) from the diazonium salts of 2-aminothiazoles by treatment with cuprous chloride, (3) by reduction of the 2-chlor thiazoles, and (4) in the case of the arylene thiazoles, from formaldehyde and o-amino thiophenols.

According to the present invention, thiazoles may be prepared easily and cheaply by the pyrolysis of 2-mercaptothiazoles. The 2-mercaptothiazoles constitute a well known class of compounds which find wide application as accelerators of the vulcanization of rubber and also may be used as ore flotation agents and as pickling inhibitors. It has now been found that these 2-mercaptothiazoles, when heated to a sufficiently high temperature, undergo decomposition by pyrolysis with the formation of substantial quantities of the corresponding thiazoles.

It is believed that the principal reaction involved is a simple decomposition of the 2-mercaptothiazole to form the corresponding thiazole and free sulfur as represented by the following equation, using 2-mercaptobenzothiazole as an example:

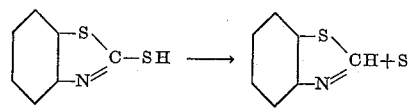

During the pyrolysis considerable quantities of hydrogen sulfide are evolved. It is believed that the sulfur becomes active at the high temperature employed and reacts with the 2-mercaptothiazole to form the dithiazyl disulfide according to the following equation:

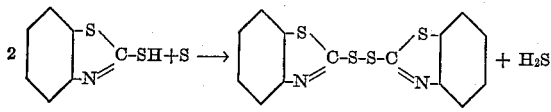

Nuclear substitution of sulfur may also occur to some extent as well as other reactions, including decompositions resulting from the high reaction temperature. The cumulative effect of these side reactions is that a tarry residue is produced but the principal product is the desired thiazole.

The practice of the invention is illustrated by the following examples.

Example 1

Three hundred grams of 2-mercaptobenzothiazole were melted by heating in a distilling flask fitted with a condenser and a thermometer, the bulb of which was immersed in the molten mercaptothiazole. At a temperature of about 270° C. there was evidence of reaction with the evolution of hydrogen sulfide and as the temperature was raised to 300–310° C., pyrolysis became more rapid and benzothiazole distilled over. This crude distillate contained about 5% of 2-mercaptobenzothiazole and also a small amount of hydrogen sulfide which was in solution and loosely combined as a hydrosulfide of benzothiazole. The product may be further purified by washing with dilute sodium hydroxide solution followed by drying with a suitable desiccant such as anhydrous sodium carbonate or partially dehydrated calcium sulfate. The dried benzothiazole may then be distilled to produce a colorless, oily liquid boiling at 227–228° C. (uncorrected) and having an odor resembling that of quinoline.

Example 2

Twenty-five grams of 2-mercapto-4-ethyl thiazole were heated in a flask as described in Example 1. The liquid product distilled over rapidly when the temperature reached 300–320° C. The crude product was purified by redistillation yielding a final product boiling at about 152° C. and having an odor resembling that of pyridine.

Other 2-mercaptothiazoles may be employed in place of those used in the foregoing examples. These mercaptothiazoles may be either alkylene or arylene thiazoles. Representative examples of other 2-mercapto alkylene thiazoles which may be employed are 2-mercapto-4,5-dimethyl thiazole, 2-mercapto-4-phenyl thiazole, 2-mercapto-4-propyl thiazole, 2-mercapto-4,5-diethyl thiazole, 2-mercapto-4-naphthyl thiazole, 2-mercapto-5-chlor thiazole, 2-mercapto-4 or 5-ethoxy thiazole, etc.

Examples of other 2-mercaptoarylenethiazoles are 2-mercapto-4-methylbenzothiazole, 2-mercapto-5-methyl-benzothiazole, 2-mercapto-6-methyl-benzothiazole, 2-mercapto-4,6-dimethylbenzothiazole, 2-mercapto - 4 - ethoxy-benzothiazole, 2-mercapto-6-methoxy benzothiazole, 2-mercapto-6-chloro-benzothiazole, 2-mercapto-4-phenyl-benzothiazole, 2 - mercapto - 6 - hydroxy-benzothiazole, and analogous naphthothiazoles.

Various metal salts of commercial grades of the 2-mercaptothiazoles, such as the zinc and sodium salts, may also be employed although tests indicate that somewhat smaller yields of the thiazole are produced than when the free 2-mercaptothiazole is used as the starting material.

In carrying out the reaction, a temperature of at least 270° C. is required and a temperature of at least 290° C. is preferred in order to secure a practical rate of reaction. There seems to be no critical upper limit of temperature but obviously the temperature should be kept below the point at which complete cracking and breakdown of the thiazole occurs, say 350° C. This upper temperature is not definite and depends in part upon the time of heating. For example, if the 2-mercaptothiazole is flashed on a hot plate, a much higher temperature may be used.

Pressures above and below atmospheric may be employed although the reaction proceeds satisfactorily at atmospheric pressure and this is the most convenient and preferred condition.

While only preferred forms of the invention have been described in detail, it will be apparent to those skilled in the art that various modifications may be made therein without departing from the scope of the invention as defined in the appended claims.

What I claim is:

1. A process for preparing a thiazole which comprises heating the corresponding 2-mercaptothiazole to a temperature sufficient to cause pyrolysis thereof with attendant splitting out of the sulfur from the mercapto group and distilling off and collecting the thiazole.

2. A process for preparing a thiazole which comprises heating the corresponding 2-mercaptothiazole at a temperature of at least 270° C. until the sulfur has been removed from the mercapto group and separating from the reaction mass the thiazole formed.

3. The process which comprises heating a 2-mercaptothiazole at a temperature of at least 270° C. until the sulfur has been removed from the mercapto group, washing the distillate therefrom with a dilute caustic solution and collecting the caustic-insoluble thiazole corresponding to the 2-mercaptothiazole.

4. A process for preparing a thiazole which comprises heating the corresponding 2-mercaptothiazole at a temperature of at least 290° C. until the sulfur has been removed from the mercapto group and distilling off and collecting the thiazole as it forms.

5. A process for preparing an aryl thiazole which comprises heating the corresponding 2-mercapto aryl thiazole at a temperature of at least 270° C. until the sulphur has been removed from the mercapto group and then recovering the aryl thiazole.

6. A process for preparing benzothiazole which comprises heating 2-mercaptobenzothiazole at a temperature of at least 270° C. until the sulfur has been removed from the mercapto group and recovering the benzothiazole formed.

WINFIELD SCOTT.